(No Model.) 2 Sheets—Sheet 1.
A. SCHMIDT & J. PESCHKE.
POTATO HILLER, DIGGER, AND CULTIVATOR.
No. 552,007. Patented Dec. 24, 1895.
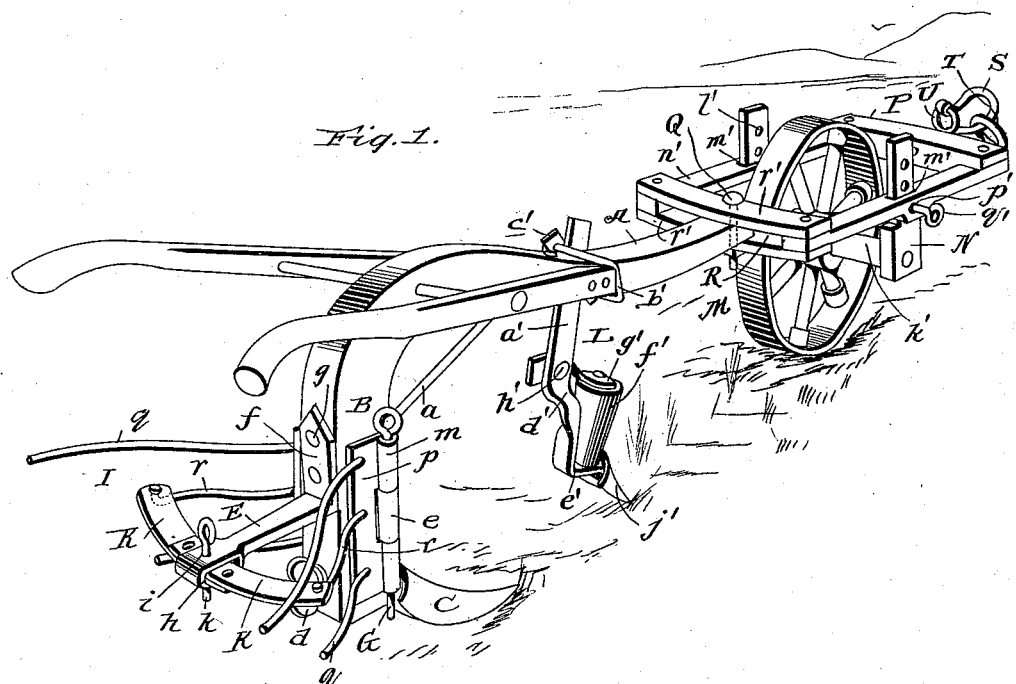
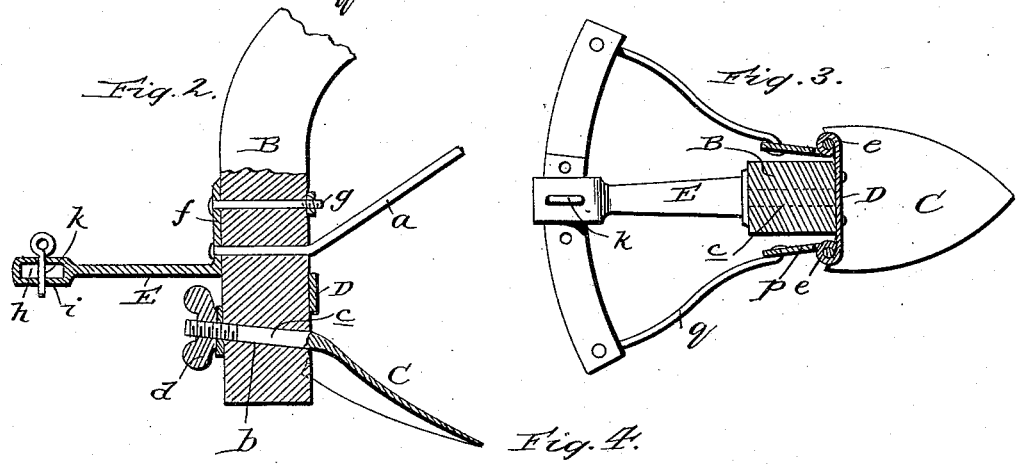

(No Model.) 2 Sheets—Sheet 2.
A. SCHMIDT & J. PESCHKE.
POTATO HILLER, DIGGER, AND CULTIVATOR.
No. 552,007. Patented Dec. 24, 1895.
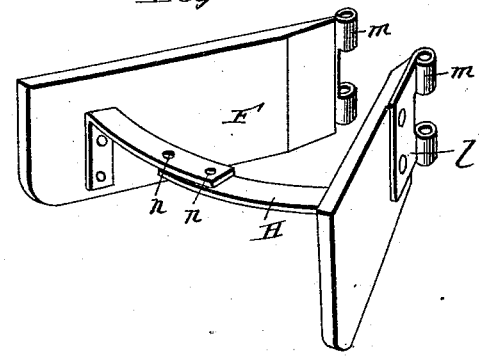
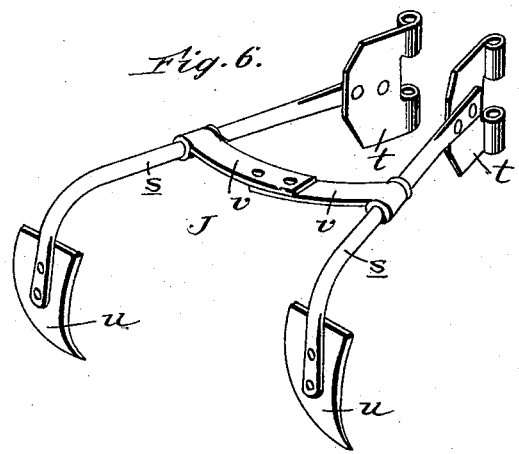
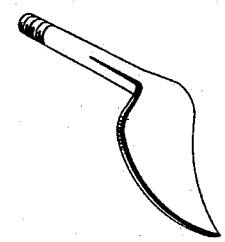

UNITED STATES PATENT OFFICE.

ALOIS SCHMIDT AND JOHANN PESCHKE, OF RICHFIELD, MINNESOTA.

POTATO HILLER, DIGGER, AND CULTIVATOR.

SPECIFICATION forming part of Letters Patent No. 552,007, dated December 24, 1895.

Application filed April 1, 1895. Serial No. 544,084. (No model.)

*To all whom it may concern:*

Be it known that we, ALOIS SCHMIDT and JOHANN PESCHKE, citizens of the United States, residing at Richfield, in the county of Hennepin and State of Minnesota, have invented certain new and useful Improvements in Potato Hillers, Diggers, and Cultivators; and we do declare the following to be a full, clear, and exact description of the invention, such as will enable others skilled in the art to which it appertains to make and use the same.

This invention relates to improvements in potato hillers, diggers and cultivators; and it has for its prime object to adapt a plow-frame to receive interchangeably plow blades or shares of different sizes, hill-boards, and rakes, whereby the device may be quickly converted into either a hiller, a digger, or a cultivator at a comparatively small expense.

Other objects and advantages of the invention will be fully understood from the following description and claims when taken in connection with the annexed drawings, in which—

Figure 1 is a perspective view of our improved machine, showing the same as a digger. Fig. 2 is a vertical sectional view through a part of the standard with the hinge-plate, plow blade or share, and bracket-arm also in section. Fig. 3 is a horizontal sectional view taken through the standard with the digging attachment in position. Fig. 4 is a side elevation, partly in section, of one of the rakes removed. Fig. 5 is a perspective view of the hill-boards removed. Fig. 6 is a perspective view of the cultivator attachment removed. Fig. 7 is a view of the plow blade or share removed.

Referring by letter to said drawings, A indicates the beam, which may be of the shape and configuration of an ordinary plow and has a standard B formed on the rear end, as shown.

In order that the frame or beam and standard may be made light, we prefer to form it of wood, and the standard is tied to the beam by a brace-rod $a$, which may be secured by nuts or other suitable fastening devices.

The standard is provided at a suitable point from its lower end with a transverse hole or aperture $b$, extending from front to rear and preferably on a slight pitch or incline, as better shown in Fig. 2 of the drawings, to receive the shank or stem $c$ of the blade or share C. This blade, which is of a form as shown, has its attaching-shank threaded, and after passing through the hole or aperture of the standard is secured in position by means of a wing-nut $d$ or the like. It is desirable to employ blades or shares of different sizes, so that a larger one may be used for digging purposes and hilling than in cultivating the soil.

D indicates a metallic plate. This plate is secured to the face of the standard at a suitable altitude and is disposed transversely thereof and terminates at opposite ends in vertically-disposed eyes $e$ arranged one on each side of the standard for a purpose which will presently appear.

E indicates a bracket-arm. This arm is of an angular form, as shown, and has its vertical branch $f$ secured to the rear side of the standard by means of a bolt $g$ and nuts or the like, and the tie or brace rod $a$ may be conveniently used in securing this bracket-arm to the standard, as will appear in Fig. 2 of the drawings. This bracket-arm, which extends rearwardly and horizontal or approximately so, is slotted at its outer end, as shown at $h$, and the branches of the slot are pierced vertically, as shown at $i$, to receive a pin $k$, the object of which will be hereinafter more fully set forth.

F indicates the hill-boards. These boards are of a sufficient length, width, and height for the purposes designed, and they each carry at their forward ends a hinge-plate $l$, having two (more or less) barrels or eyes $m$ to register with the eyes $e$ of the plate D, which is secured to the standard, and receive a rod or pintle G, so as to connect the parts in a hinged manner. These boards have also secured to their inner sides metallic arms H, which are of a curvilinear form and are designed to overlap one another, as shown. These overlapping portions are provided with perforations $n$, so that they may be brought in alignment with and passed through the slot $h$ of the bracket-arm E to receive the pin $k$. By the employment of these curvilinear arms we are enabled to adjustably secure the hill-boards laterally, so as to throw a hill of greater or less width.

I indicates the rakes, which are used in digging the potatoes. These rakes comprise hinge-plates $p$, having eyes $m$ to register with the eyes in the plate D, secured to the standard in a manner similar to the hill-boards, and extending rearwardly from these plates are rods $q$, which may increase in length from the lower to the upper one. In the present illustration we have shown three of these rods, but it is obvious that more or less may be used. Two of the rods $r$ carry at their outer ends curvilinear plates or arms K, which are perforated, overlap each other, and are designed to be adjustably secured in the slot $h$ of the bracket-arm E in a manner similar to the curvilinear arms of the hill-boards, so that the rakes may be adjusted laterally.

J indicates the cultivator attachment, which comprises the two beams or rods $s$, having the hinge-plates $t$ at their forward ends and the cultivator points or blades $u$ at their rear downwardly-curved ends. The hinge-plates $t$ have barrels or eyes of a similar character to those of the hill-boards and rakes and are adapted to be connected with the plate D of the standard in a similar manner. These cultivator arms or beams carry at a suitable point in their length two curvilinear arms $v$, which overlap each other and are perforated at the overlapped portions and are designed to enter the slot in the bracket-arm and be adjustably secured thereto in the same way as said hill-boards and rakes. It will thus be seen that we adapt the hill-boards, the cultivator-arms and the rakes to be used interchangeably on the standard, and they are all attached by the same means and adjusted in a similar manner.

L indicates the colter. This colter has its arm or standard $a'$ secured to the beam A by means of a yoke $b'$ and a plate $c'$ with nuts or other suitable fastening devices, so that the colter may be adjusted vertically and quickly removed and replaced when desired. This arm is bent laterally at a suitable point in its length, as shown at $d'$, and is then bent forwardly, as shown at $e'$, to form a seat for the lower end of a roller $f'$. This roller is of a tapering or conical form with its enlarged end uppermost and is designed to rotate in its lower bearing and also in its upper bearing which comprises an arm or strap $g'$ secured to the standard by means of a bolt $h'$. This colter being arranged in advance of the plow-blade and carrying an opening-point $j'$ will serve to cut the earth, and such weeds, trash, or other substance as may come into contact with the colter will be cast down by the roller, which has a tendency to throw such weeds or other substances down and sidewise.

M indicates the gage-wheel. This gage-wheel has its axle $k'$ journaled in hangers N, which have their upright stems perforated transversely, as shown at $l'$, and said hangers pass through vertical apertures $m'$ in the side rails $n'$ of a frame P. This frame is also provided with lateral apertures $p'$ which bisect the vertical apertures $m'$ to receive a pin $q'$. By this construction it will be seen that the gage-wheel can be adjusted vertically in the frame P. This frame P, which serves the twofold function of supporting the gage-wheel and balancing the machine, is connected with the forward end of the beam A by means of a bolt Q or the like, and the rear end of said frame is slotted, as shown at R, to receive the plow-beam, and the slot may be formed by the employment of two cross-bars $r'$, secured at their ends to the rear ends of the side bars $n'$. The forward end of this balance-frame carries a hook S to receive a ring T for the attachment of the draft animal or animals, and the end of the hook carries a ring U, which lies obliquely within the curvature of the hook so that it will prevent the ring T from accidental displacement, but will permit it being quickly and readily removed and replaced.

From the foregoing description, taken in connection with the accompanying drawings, the operation of our invention will be obvious. It will be seen that the beam or frame as equipped in Fig. 1 of the drawings is ready for digging purposes. When it is desirable to change it so as to dig a furrow and for hilling purposes it is simply necessary to remove the rakes and replace them by the hill-board. Should it then be necessary to use the cultivator-points, the hill-boards may be readily removed and replaced by the cultivator attachment, and when the cultivators are used it is preferable to remove the large share or plow-blade and replace it by a small one.

Having described our invention, what we claim is—

1. The combination of the beam having the depending standard B, the plow blade connected to and arranged in front of the standard, the plate D, connected to the forward side of said standard B, and having the vertically disposed eyes at its ends, the bracket E, connected to and extending rearwardly from the standard B, and having the horizontally-disposed slot $h$, adjacent to its rear end and also having the aligned vertical apertures $i$, in the walls of said slot, the hinge plates having vertically-disposed eyes adapted to be placed in alignment with the eyes of the plate D, and carrying rakes, hill-boards, or cultivators, removable pintles arranged in the eyes of said hinge plates and plate D, and detachably connecting the same, the curvilinear arms secured to the rakes, hill-boards or cultivators and lapped and passed through the horizontal slot $h$, of the bracket E, and having a plurality of apertures at intervals in their length, and a pin taking through the apertures in the walls of the slot $h$, and the apertures of the arms, substantially as and for the purpose set forth.

2. The beam and standard constructed as described, in combination with the plow blade or share, the hinge plate, the plates carrying rakes, hill-boards, or cultivators and connected to said hinge plate, the slotted bracket secured to the rear of the standard, the curvilinear and perforated plates for adjustably connecting the rakes, hill-boards, and cultivators to said bracket, the vertically-adjustable gage wheel, the balance frame supporting said wheel, and connected to the forward end of the beam, and the adjustable and rotary colter secured to the beam between the standard and gage wheel, substantially as specified.

In testimony whereof we affix our signatures in presence of two witnesses.

ALOIS SCHMIDT.
JOHANN PESCHKE.

Witnesses:
ALBERT MUELLER,
W. J. BRUGGEMANN.